(12) United States Patent
Finkelstein et al.

(10) Patent No.: US 9,195,706 B1
(45) Date of Patent: Nov. 24, 2015

(54) PROCESSING OF DOCUMENT METADATA FOR USE AS QUERY SUGGESTIONS

(71) Applicant: Google Inc., Mountain View, CA (US)

(72) Inventors: Lev Finkelstein, Netanya (IL); Benedict Gomes, Palo Alto, CA (US); Gunes Erkan, Brooklyn, NY (US); Eddo Kim, Raanana (IL)

(73) Assignee: GOOGLE INC., Mountain View, CA (US)

( * ) Notice: Subject to any disclaimer, the term of this patent is extended or adjusted under 35 U.S.C. 154(b) by 290 days.

(21) Appl. No.: 13/782,770

(22) Filed: Mar. 1, 2013

Related U.S. Application Data

(60) Provisional application No. 61/605,944, filed on Mar. 2, 2012.

(51) Int. Cl.
*G06F 17/30* (2006.01)
(52) U.S. Cl.
CPC ...... *G06F 17/30395* (2013.01); *G06F 17/3064* (2013.01)
(58) Field of Classification Search
CPC .................................................. G06F 17/3064
USPC .......................... 707/737, 739, 741, 752, 767
See application file for complete search history.

(56) References Cited

U.S. PATENT DOCUMENTS

| 7,487,145 | B1 | 2/2009 | Gibbs et al. | |
|---|---|---|---|---|
| 7,499,940 | B1 | 3/2009 | Gibbs | |
| 7,756,855 | B2 | 7/2010 | Ismalon | |
| 7,836,044 | B2 | 11/2010 | Kamvar et al. | |
| 8,949,215 | B2 * | 2/2015 | Wang et al. | 707/708 |
| 2007/0130112 | A1 * | 6/2007 | Lin | 707/2 |
| 2009/0077124 | A1 * | 3/2009 | Spivack et al. | 707/103 Y |
| 2014/0074812 | A1 * | 3/2014 | Ruhela et al. | 707/706 |

FOREIGN PATENT DOCUMENTS

WO 2006055120 7/2006

* cited by examiner

*Primary Examiner* — Marc Filipczyk
(74) *Attorney, Agent, or Firm* — Middleton Reutlinger

(57) ABSTRACT

Methods, systems and apparatus are described herein that include obtaining metadata within a document, where the metadata comprises a sequence of terms. Tags are assigned to terms in the sequence of terms based at least in part on grammatical relationships between the terms, thereby forming a corresponding sequence of tags. A determination is made that the sequence of terms is grammatically correct based at least in part on tags within the corresponding sequence of tags. In response to the determination, the sequence of terms is stored as a query suggestion.

21 Claims, 6 Drawing Sheets

PROCESSING OF DOCUMENT METADATA FOR USE AS QUERY SUGGESTIONS

CROSS REFERENCE TO RELATED APPLICATIONS

This application claims the benefit of U.S. Provisional Application No. 61/605,944 filed on Mar. 2, 2012, entitled "Processing of Document Metadata for Use as Query Suggestions," the disclosure of which is incorporated by reference herein in its entirety.

BACKGROUND

The present disclosure relates to creating search query suggestions.

Information retrieval systems, such as Internet search engines, help users by retrieving information, such as web pages, images, text documents and multimedia content, in response to queries. Search engines use a variety of signals to determine the relevance of the retrieved content to a user's query.

Formulating a query that accurately represents the user's informational need can be challenging. Search engines may suggest queries to the user, to help the user. Some search engines provide query suggestions to the user as the user is typing a query.

The queries suggested by the search engine often are taken from past user queries. However, an ever-growing document collection such as the World Wide Web may include accessible information that has not been previously requested via the past user queries.

SUMMARY

In one implementation, a method is described that includes obtaining metadata for a document, where the metadata includes a sequence of terms. The method further includes assigning a tag to each term in the sequence of terms based at least in part on grammatical relationships between the terms, resulting in a corresponding sequence of tags. The method further includes determining that the sequence of terms is grammatically correct based at least in part on tags within the corresponding sequence of tags. The method further includes storing the sequence of terms as a query suggestion in response to the determination.

This method and other implementations of the technology disclosed can each optionally include one or more of the following features.

The method can further include obtaining a document score for the document. The document score can be based at least in part on a relative ranking of the document among a plurality of documents. In response to the determination, the method can further include calculating a suggestion score for the query suggestion based at least in part on the document score. Storing the query suggestion can include storing the suggestion score with the query suggestion.

The query suggestion can be stored within a database of query suggestions. The database can include one or more additional query suggestions which have been submitted as past search queries by prior users. An additional query suggestion may have a suggestion score based at least in part on a frequency that the additional query suggestion was submitted as a past search query by the prior users.

The method can further include receiving a partial search query. One or more query suggestions in the database can then be selected for the partial search query based at least in part on the suggestion scores. The selected query suggestions can then be sent in response to receiving the partial search query.

Obtaining metadata for the document can include obtaining a title of the document.

Obtaining metadata for the document can include segmenting the metadata for the document into a plurality of sequences of terms. Assigning a tag can include assigning a tag to each term in a given sequence of terms in the plurality of sequences of terms.

The assigned tags can be part-of-speech tags.

Determining that the sequence of terms is grammatically correct can be based on a number of tags that is less than the total number of terms in the sequence of terms.

Determining that the sequence of terms is grammatically correct can be based at least in part on an order of the tags within the corresponding sequence of tags.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Particular implementations of the subject matter described herein identify metadata within a document which can be processed for use as query suggestions. These query suggestions represent information requests related to accessible information within the document, which may be outside the information coverage of past user queries. These query suggestions thus allow additional query suggestions to be provided to users, which increases the likelihood of assisting users in finding the information they seek. In doing so, meaningful query suggestions can be provided to users seeking information that is outside the coverage of past user queries.

Particular aspects of one or more implementations of the subject matter described in this specification are set forth in the drawings and the description below. Other features, aspects, and advantages of the subject matter will become apparent from the description, the drawings, and the claims.

DETAILED DESCRIPTION

Technology is described herein for identifying metadata within a document which can be processed for use as query suggestions. The term metadata refers to data that describes characteristics of other data within the document. The metadata may for example be associated with meta tags within the document. The metadata may for example contain information such as a title of the document, a general and/or detailed description of content in the document, information associated with embedded or linked media content such as images or videos within the document, or other information not displayed to users viewing the document in a web browser or other application.

The technology includes assigning tags to terms in a sequence of terms contained in the metadata within the document based on grammatical relationships between the terms. The assignment of the tags forms a corresponding sequence of tags. The tags may for example be part-of-speech tags. A part-of-speech tag labels a given term as a particular part of speech based on the term, and optionally based on the context of the term within the sequence of terms. Alternatively, other techniques may be used to assign the tags.

The grammar of the sequence of terms is then checked based at least in part on tags in the sequence of tags. If the grammar of the sequence of terms is determined to be correct, the sequence of terms can then be stored as being permitted for use as a new query suggestion. As a result of the grammar checking, the form of the sequence of terms can be expressed in natural language generally understood and accepted by users.

These grammatically correct query suggestions represent well-formed information requests related to accessible information within the document, which may be outside the information coverage of past user queries. These query suggestions thus allow additional query suggestions to be provided to users, which increases the likelihood of assisting users in finding the information they seek. In doing so, meaningful query suggestions can be provided to users seeking information that is outside the coverage of past user queries.

Figure 1:
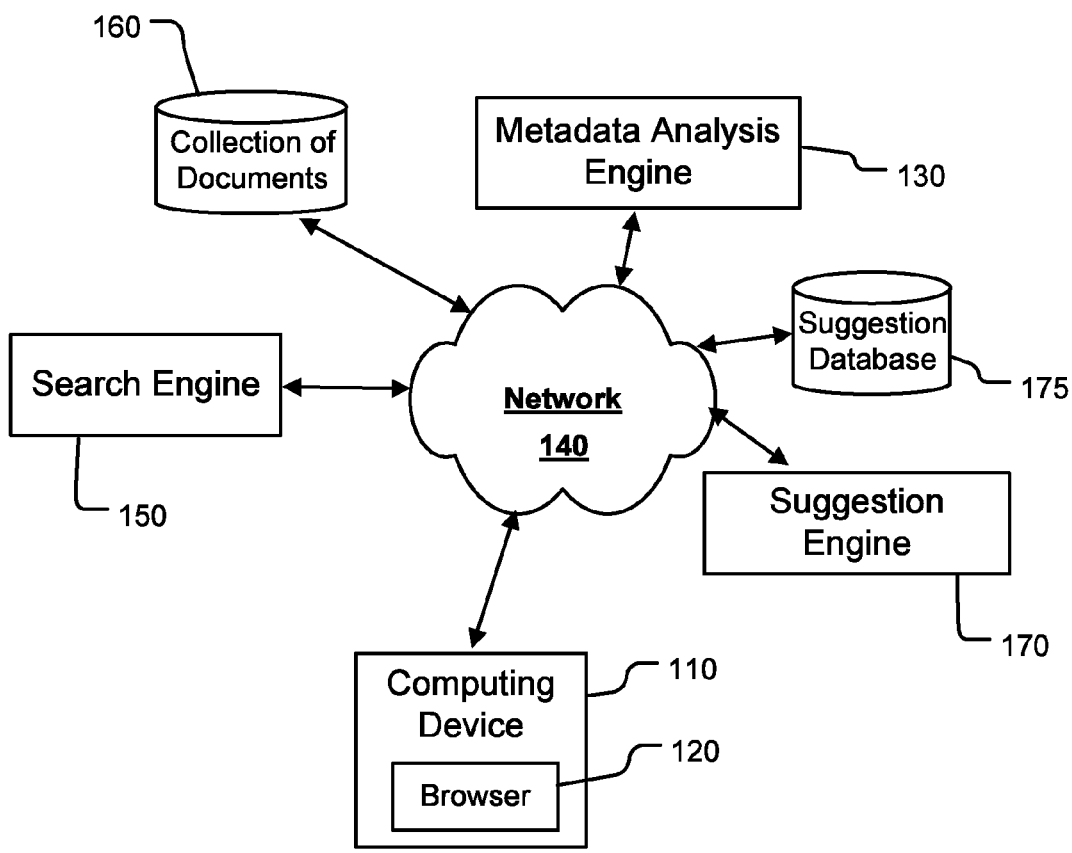
FIG. 1 illustrates a block diagram of an example environment in which identifying metadata within a document which is suitable for use as query suggestions can be used.

FIG. 1 illustrates a block diagram of an example environment 100 in which identifying metadata within a document which is suitable for use as query suggestions can be used. The environment 100 includes a client computing device 110 and a search engine 150. The environment also includes a communication network 140 that allows for communication between various components of the environment 100.

In one implementation, the network 140 includes the Internet. The network 140 can also utilize dedicated or private communication links that are not necessarily part of the Internet. In one implementation, the network 140 uses standard communication technologies, protocols, and/or inter-process communication technologies.

During operation, a user interacts with the search engine 150 through use of the client computing device 110. The client computing device 110 and the search engine 150 each include memory for storage of data and software applications, a processor for accessing data and executing applications, and components that facilitate communication over the communication network 140.

The client computing device 110 executes an application, such as a web browser 120, which allows the user to formulate complete search queries and submit them to the search engine 150. The client computing device 110 may be for example a desktop computer, a laptop, a tablet computer, a mobile phone, or any other type of computing device.

The search engine 150 receives a complete search query submitted from the client computing device 110, and executes the search query against a collection of documents 160 such as web pages, images, text documents and multimedia content. The search engine 150 identifies documents in the collection of documents 160 which match the search query, and responds by generating search results which are transmitted to the client computing device 110 in a form that can be presented to the user. For example, in response to a query from the computing device 110, the search engine 150 may transmit a search results web page to be displayed in the web browser 120 executing on the client computing device 110.

The environment 100 also includes a metadata analysis engine 130. The metadata analysis engine 130 identifies metadata contained within documents in the collection of documents 160 that is suitable for use as query suggestions using the techniques described herein. The metadata analysis engine 130 can be implemented in hardware, firmware, or software running on hardware.

The metadata analysis engine 130 may also calculate suggestion scores for these query suggestions and store them within a suggestion database 175 of query suggestions. The suggestion database 175 is used by a suggestion engine 170 (described below) to select query suggestions for a user's query. A suggestion score for a given query suggestion indicates an estimate of the extent to which the given query suggestion represents an information request of interest to users. The metadata analysis engine 130 is described in more detail below with reference to FIGS. 2-5.

In addition to the query suggestions provided by the metadata analysis engine 130, the suggestion database 175 may also include additional query suggestions that have been obtained using other techniques. For example, these additional query suggestions may include popular past search queries that have been submitted to the search engine 150 by prior users. In such a case, these popular past search queries may be stored in a record that is analyzed by the suggestion engine 170 to determine which of the past search queries to include as query suggestions within the suggestion database 175. For these past search queries, the suggestion engine 170 may for example calculate suggestion scores based on their popularity. In one implementation, popularity is determined based on the frequency with which prior users submitted the past search queries to the search engine 150.

During operation, an application such as the web browser 120 executing on the client computing device 110 may forward the user's query to the suggestion engine 170. The user's query may be a partial query or a complete query. A partial query is a query formulated by a user prior to an indication by the user that the query is complete. A user may indicate completion of the query by entering a carriage return or equivalent character. As another example, the user may indicate completion of the query by selecting a search button in a user interface presented to the user during entry of the query. As yet another example, the user may indicate completion of the query by saying a command in a speech interface or pausing more than a predetermined period of time.

The suggestion engine 170 includes memory for storage of data and software applications, a processor for accessing data and executing applications, and components that facilitate communication over the communication network 140. In response to the user's query, the suggestion engine 170 selects a group of query suggestions in the suggestion database 175 for the user's query based at least in part on their corresponding suggestion scores. The suggestion engine 170 may use a variety of different techniques to determine which query suggestions in the suggestion database 175 to select for the user's query.

In some implementations, the suggestion engine 170 selects the query suggestions by first calculating matching scores for the query suggestions in the suggestion database 175. A matching score for a given query suggestion represents an extent to which the text of the given query suggestion is a match for the text of the user's query. The suggestion engine 170 may for example calculate the matching scores using prefix based matching, where the prefix is one or more terms occurring at the beginning of a query. In such a case, the matching score for a given query suggestion may be assigned the highest value if the given query suggestion includes the user's query as a prefix. If the given query suggestion does not include the user's query as a prefix, its matching score may be assigned the lowest value. Other techniques may also or alternatively be used to calculate the matching scores.

The suggestion engine 170 can then calculate final scores for one or more of the query suggestions in the suggestion database 175 using the suggestion scores and the matching scores. The final score for a given query suggestion can be calculated as a function of its suggestion score and its matching score. For example, the final score for a given query suggestion can be calculated as a weighted average of its suggestion score and its matching score.

The suggestion engine 170 can then select one or more of the query suggestions in the suggestion database 175 for the user's query based at least in part on the final scores. For example, a predetermined number of query suggestions having the highest final scores may be selected. Other criteria may also or alternatively be used. For example, the final scores may be compared to a threshold, and the query suggestions having final scores that satisfy the threshold may be selected.

The suggestion engine 170 can then provide these selected query suggestions to the user. Alternatively, the suggestion engine 170 may provide these query suggestions to the search engine 150, which in turn provides them to the user.

These query suggestions provided by the suggestion engine 170 represent queries that the user may want to submit in addition to, or instead of, the query actually being typed or submitted. In the case in which the user's query is a complete search query, the query suggestions may, for example, be embedded within a search results web page to be displayed in an application, such as a web browser 120, executing on the client computing device 110. This search results web page may also include search results for the user's query.

In the case in which the user's query is a partial query, the query suggestions may be displayed within a cascaded drop down menu of the search field of an application, such as a web browser 120, executing on the client computing device 120 as the user is typing the query. In some implementations, search results for a query suggestion within the cascaded drop down menu are also displayed as the user is typing the query.

Many other configurations are possible having more or less components than the environment 100 shown in FIG. 1. For example, the environment 100 can include multiple search engines. The environment 100 can also include many more client computing devices that submit queries.

Figure 2:
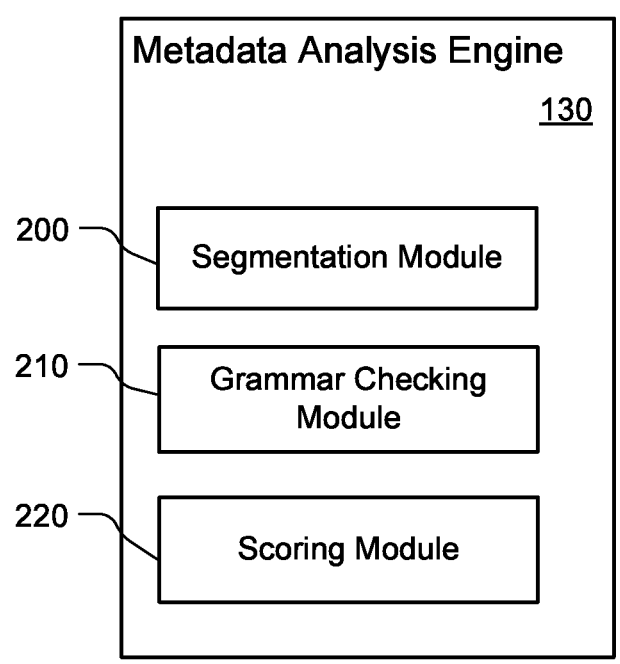
FIG. 2 is a block diagram illustrating example modules within the metadata analysis engine.

FIG. 2 is a block diagram illustrating example modules within the metadata analysis engine 130. In FIG. 2, the metadata analysis engine 130 includes a segmentation module 200, a grammar checking module 210, and a scoring module 220. Some implementations may have different and/or additional modules than those shown in FIG. 2. Moreover, the functionalities can be distributed among the modules in a different manner than described herein.

The segmentation module 200 selects a document within the collection of documents 160. The segmentation module 200 may use a variety of different techniques to determine which document within the collection of documents 160 to select. For example, the segmentation module 200 may select documents based on document scores (described below) assigned by the search engine 150. In such a case, the segmentation module 200 may select a document having a document score that satisfies a threshold. The segmentation module 200 may also use other signals to determine which document to select.

The search engine 150 may calculate the document scores using a scoring function used to rank the documents within search results provided in response to complete search queries. The document score of a document within the collection of documents 160 thus represents a relative ranking of the document among documents within the collection of documents 160. The search engine 150 can use conventional and/or other techniques to calculate the document scores.

The segmentation module 200 then identifies one or more instances of metadata within the selected document. The metadata may be in a variety of different formats and may contain information such as a title of the document, a general and/or detailed description of content in the document, or information associated with embedded or linked media content such as images or videos within the document.

A given instance of metadata is a sequence of terms that can include one or more words, numbers, characters or other text-based symbols. The given instance of metadata may for example be one or more sentences. Alternatively, the given instance of metadata may be less than a complete sentence.

For each instance of metadata, the segmentation module 200 segments the metadata into one or more sequences of terms, where each sequence includes multiple terms. A variety of different techniques can be used to determine how to segment an instance of metadata. In some implementations, the metadata is segmented into all possible sequences of terms. In instances in which the metadata includes a large number of terms, the number of sequences that are formed may be limited to a predetermined maximum number. A threshold may also be imposed on the maximum number of terms within a sequence.

The same terms within an instance of metadata may be segmented into multiple sequences of terms. As an example, the sequences of terms for the metadata "funny cat in the box-video" may include "funny cat", "funny cat video", "funny cat in the box", and "funny cat in".

The metadata may for example be segmented using a parser trained on past search queries that have been submitted to the search engine 150 by prior users. The parser may for example be trained using machine language learning or other techniques. For example, the training may include using part-of-speech subsequences as a delimiter signal, along with punctuation. As another example, the training may include using dependency parsing, and segmenting according to the sub-trees produced by the dependency parser. In some implementations, the training involves the use of only positive examples. Alternatively, the training may include the use of negative examples.

The metadata may alternatively be segmented using other techniques. For example, the metadata may be segmented based on sentence boundaries within the metadata. A sentence boundary is one or more characters in the metadata used to indicate that one sentence has ended and another sentence is beginning. A sentence boundary can be for example punctuation such as a period or an exclamation point. As another example, the metadata may be segmented based on punctuation boundaries within a sentence such as a comma, dash, or semicolon. As another example, the metadata may be segmented along font transitions where sequential terms in the metadata change font type and/or size.

In some implementations, the segmentation module 200 selects terms within an instance of metadata to form the one or more sequences of terms. The techniques for extracting the terms can vary from implementation to implementation. For example, the segmentation module 200 may detect repeated sequences of terms within the metadata, and only select a single occurrence of these repeated sequences. As another example, the segmentation module 200 may ignore consecutive punctuation marks. Punctuation within the instance of metadata that exceeds a threshold number may also be ignored.

The segmentation module 200 then provides the sequences of terms to the grammar checking module 210. For each sequence of terms, the grammar checking module 210 assigns tags to terms in the given parsed sequence of terms based on grammatical relationships between terms in the sequence of terms. The assignment of the tags forms a corresponding sequence of tags.

The techniques for assigning the tags can vary from implementation to implementation. In some implementations, the assigned tags are part-of-speech tags. Alternatively, other techniques such as dependency parsing may be used to assign the tags. In dependency parsing the sequence of terms is represented as a tree based on their dependency relations. The terms in the tree can then be encoded into a sequence of tags by assigning tags to the terms, by assigning labels to the vertices in the tree, or by enumerating the nodes directly. The same node may have several tags associated with it. For example, these assigned tags may also be based on the part of speech of each term in the tree.

A part-of-speech tag labels a given term as a particular part of speech based on the term and optionally based on the context of the term within the sequence of terms. A part-of-speech tag may for example label a given term as a noun, verb, adjective, adverb, preposition, determiner, etc. Nouns and/or verbs can be further divided into part-of-speech tags. For example, nouns can be further divided into part-of-speech tags for singular nouns and for plural nouns. Also, for example, verbs can be further divided into part-of-speech tags for past tense verbs and for present tense verbs, etc.

The part-of-speech tag for a given term may be assigned according to predetermined assignment rules based on the term, and optionally one or more other terms in the sequence of terms. Alternatively, the part-of-speech tags may be assigned using statistical models or other techniques.

The grammar checking module 210 then checks the grammar of a given sequence of terms based the tags within the corresponding sequence of tags. In some implementations, the grammar checking module 210 checks the grammar using all of the tags in the corresponding sequence of tags. Alternatively, the number of tags used by the grammar checking module 210 may be less than the total number of terms within the corresponding sequence of terms. For example, in some implementations, only the tags assigned to a predetermined number of terms at the end of the sequence of tags may be used by the grammar checking module 210. In doing so, a long sequence which is grammatically correct is more likely to be classified properly when using a classifier that is trained using a large number of short sequences.

In some implementations, the grammar checking is based at least in part on the order of the tags within the sequence of tags. The order of the tags indicates the underlying grammatical structure of the corresponding sequence of terms, so that sequences that include grammatical errors can be identified.

A grammatically incorrect sequence of terms in a particular language may include one or more grammar errors that do not comply with grammar rules of the particular language. These grammar errors can include subject-verb disagreement, disagreement between an indefinite article and the following term, adjectives incorrectly used as adverbs, and other errors.

The grammar checking may for example be carried out by comparing the sequence of tags to a database of predetermined sequences of tags that correspond to correct grammar. Alternatively, the grammar checking may be carried out by determining whether the order of the tags satisfies a set of rules based on the types of tags in the sequence of tags.

In some implementations, the grammar checking module 210 is a classifier trained using a training set of sequences of tags corresponding to past search queries submitted by prior users. Additional signals, such as the number of terms within each sequence of terms, may also be used by the classifier. The classifier may be for example a decision tree, a support vector machine, or a threshold based classifier.

If the grammar checking module 210 determines that the sequence of terms is not grammatically correct, the sequence is rejected as not being suitable for use as a query suggestion. The rejected sequence of terms is flagged so that it is not further processed by the metadata analysis engine 130.

If the grammar checking module 210 determines that the sequence of terms is grammatically correct, the sequence is suitable for use as a query suggestion and is provided to the scoring module 220.

The scoring module 220 calculates a suggestion score for the sequence of terms as a query suggestion. The suggestion score for a sequence of terms indicates an estimate of the extent to which the sequence of terms represents an information request of interest to users.

The scoring module 220 calculates the suggestion score for the sequence of terms based at least in part on a document score for the document that contains the sequence as metadata. The document score for the document is based at least in part on a relative ranking of the document among multiple documents in the collection of documents 160. As described above, in some implementations the document score for the document may be obtained from the search engine 150.

The techniques for calculating the suggestion score for the sequence of terms can vary from implementation to implementation. The suggestion score may for example be proportional to the document score. Alternatively, other functions may be used.

The sequence of terms and its corresponding suggestion score can then be stored as a query suggestion in the suggestion database 175. As described above, this query suggestion can then be selected by the suggestion engine 170 for a user's query and provided to the user.

In some implementations, the suggestion database 175 may store data indicating which of the query suggestions have been stored by the metadata analysis engine 130. This data may for example be used so that the query suggestions stored by the metadata analysis engine 130 can be displayed to users in a manner that allows the users to distinguish these query suggestions from the other query suggestions in the suggestion database 175. For example, the query suggestions stored by the metadata analysis engine 130 may be displayed to users in a different color than the other query suggestions in the suggestion database 175.

In some implementations, the query suggestions stored by the metadata analysis engine 130 may be arranged at the beginning or end of a list of query suggestions selected by the suggestion engine 170 for a user's query. That is, the query suggestions stored by the metadata analysis engine 130 that have been selected for a user's query may be displayed before or after the other selected query completions in the suggestion database 175. Alternatively, other techniques for combining the query suggestions stored by the metadata analysis engine 130 with the other query suggestions in the suggestion database 175 may be used.

Figure 3:
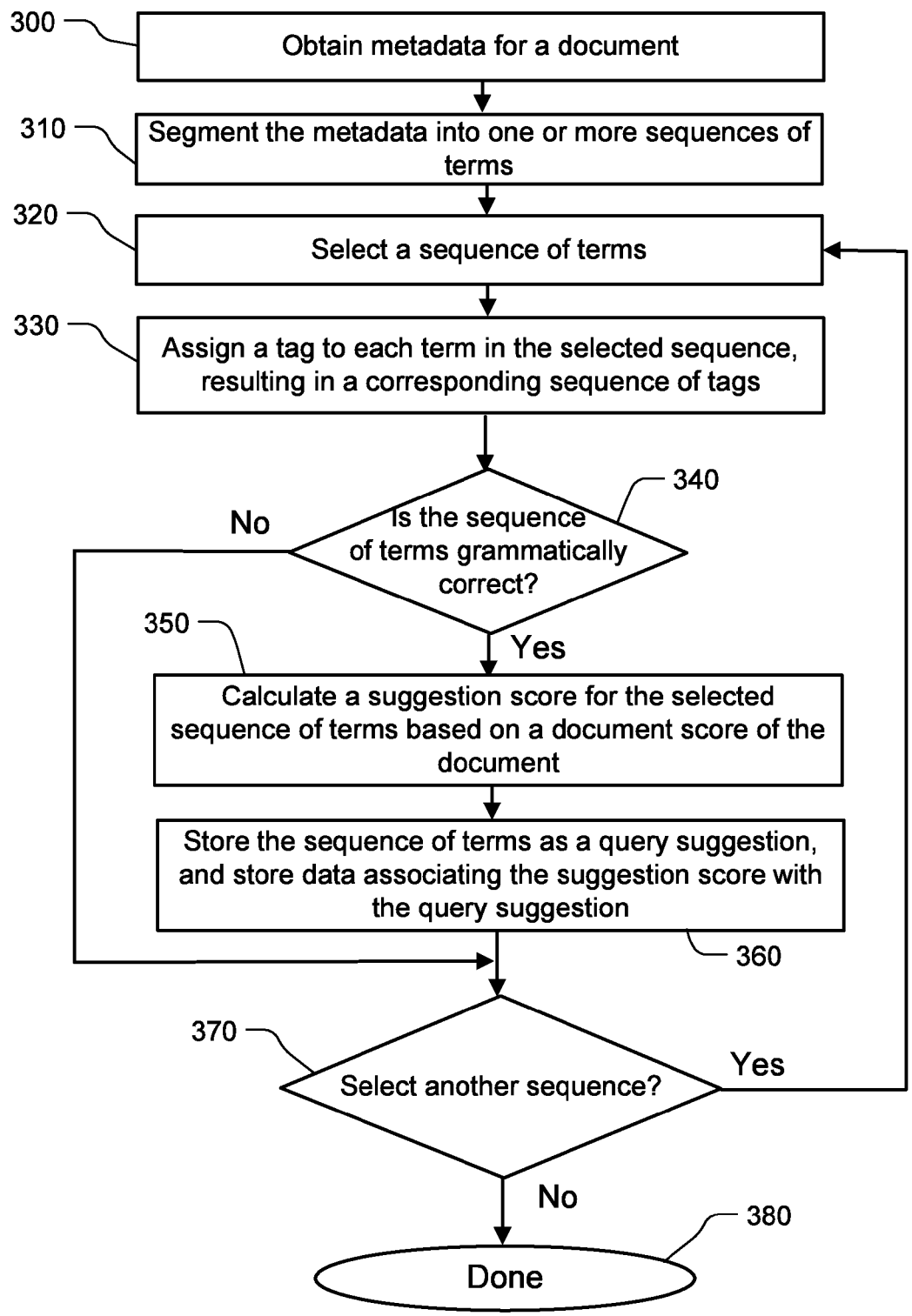
FIG. 3 is a flow chart illustrating an example process for identifying metadata within a document which is suitable for use as query suggestions.

FIG. 3 is a flow chart illustrating an example process for identifying metadata within a document which is suitable for use as query suggestions. Other embodiments may perform the steps in different orders and/or perform different or additional steps than the ones illustrated in FIG. 3. For convenience, FIG. 3 will be described with reference to a system of one or more computers that performs the process. The system can be, for example, the metadata analysis engine 130 described above with reference to FIGS. 1 and 2.

At step 300, the system obtains metadata for a document. The document that includes the obtained metadata may for example be selected because its document score satisfies a threshold.

At step 310, the system segments the metadata into one or more sequences of terms. The metadata may for example be segmented using the techniques described above.

At step 320, the system selects a sequence of terms. At step 330, the system assigns a tag to each term in the selected sequence of terms, resulting in a corresponding sequence of tags. The system may for example assign part-of-speech tags using the techniques described above.

At step 340, the system then determines whether the selected sequence of terms is grammatically correct based at least in part on tags in the corresponding sequence of tags. The system may for example make this determination using the techniques described above. If the sequence of terms is grammatically correct, the sequence of terms is suitable for use as a query suggestion, and the process continues to step 350. If the sequence of terms is not grammatically correct, the sequence of terms is classified as not suitable for use as a query suggestion, and the process skips step 350 and instead continues to step 370.

At step 350, the system calculates a suggestion score for the sequence of terms based on a document score for the document. The suggestion score may for example be calculated using the techniques described above. At step 360, the system stores the sequence of terms as a query suggestion. The system also stores data associating the suggestion score with the query suggestion.

At step 370, the system determines whether there are additional segmented sequences of terms that need to be tagged and potentially stored as query suggestions. If so, the process returns to step 320, where another segmented sequence of terms is selected. Once all of the segmented sequences of terms have been tagged and potentially stored as query suggestions, the process ends at step 380.

Figure 4:
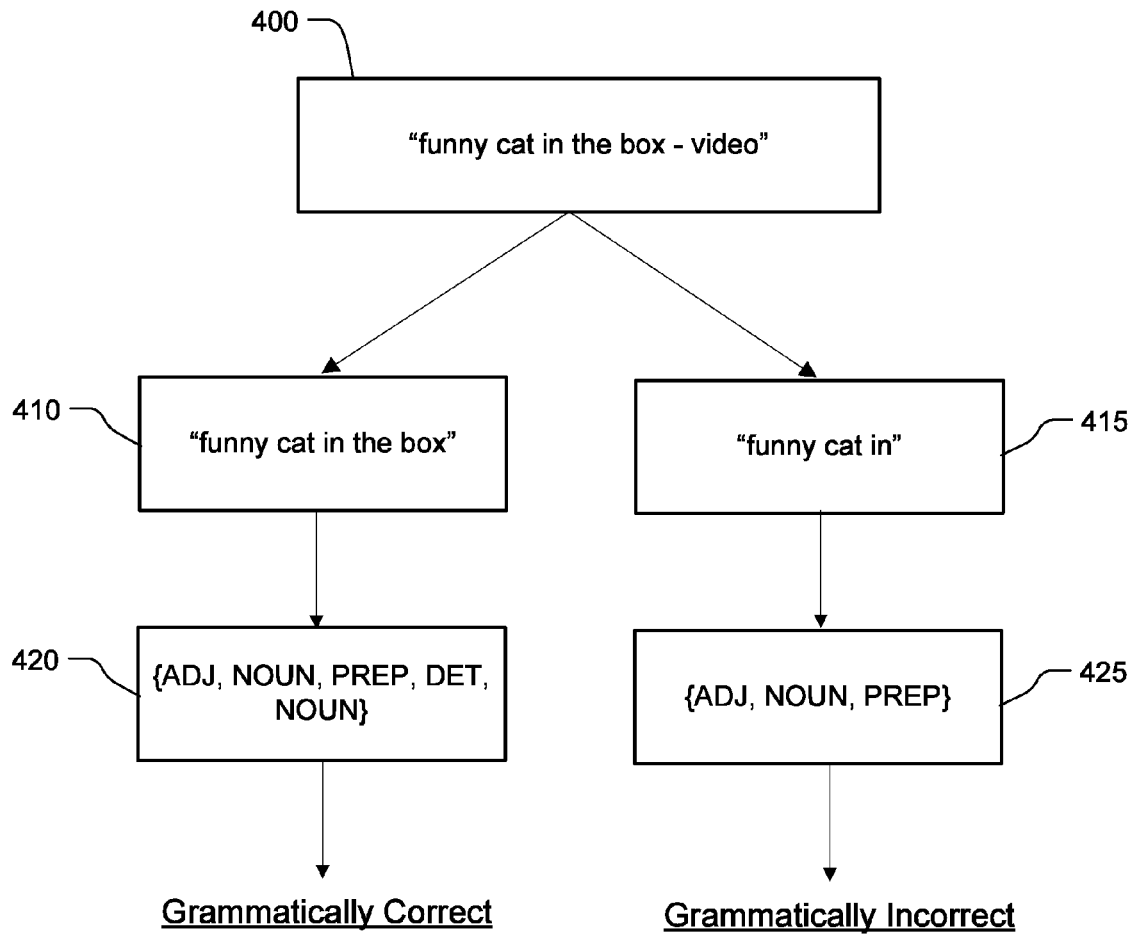
FIG. 4 illustrates an example of segmenting metadata within a document to identify a sequence of terms suitable for use as a query suggestion.

FIG. 4 illustrates an example of segmenting metadata within a document to identify a sequence of terms suitable for use as a query suggestion.

In this example, the metadata 400 is "funny cat in the box-video".

The metadata 400 is then segmented into a first sequence of terms 410 and a second sequence of terms 420. In this example, the terms in the first sequence of terms 410 are then assigned part-of-speech tags to form a first sequence of tags 420. In this example, the term "funny" is assigned the part-of-speech tag ADJ because the term is an adjective, the term "cat" is assigned the part-of-speech tag NOUN because the term is a noun, the term "in" is assigned the part-of-speech tag PREP because the term is a preposition, the term "the" is assigned the part-of-speech tag DET because the term is a determiner, and the term "box" is assigned the part-of-speech tag NOUN because the term is a noun. Similarly, the terms in the second sequence of terms 415 are assigned part-of-speech tags to form a second sequence of tags 425.

The first sequence of tags 420 is then analyzed to determine whether the corresponding first sequence of terms 410 is grammatically correct. Similarly, the second sequence of tags 425 is analyzed to determine whether the corresponding second sequence of terms 425 is grammatically correct.

Is this example, the analysis indicates that the first sequence of terms 410 is grammatically correct. Thus, the first sequence of terms 410 can then be scored and stored for use as a query suggestion using the techniques described herein. In contrast, the analysis indicates that the second sequence of terms 415 is grammatically incorrect because it ends with a preposition. Thus, it may be determined that the second sequence of terms will not be stored for use as a query suggestion.

Figure 5:
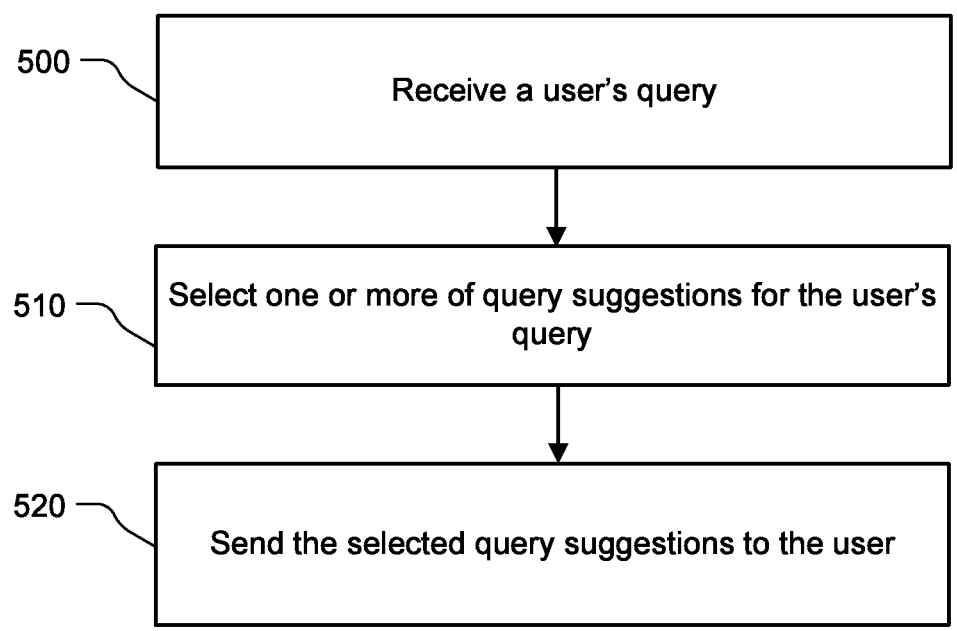
FIG. 5 is a flow chart illustrating an example process for providing query suggestions to a user.

FIG. 5 is a flow chart illustrating an example process for providing query suggestions to a user. Other embodiments may perform the steps in different orders and/or perform different or additional steps than the ones illustrated in FIG. 5. For convenience, FIG. 5 will be described with reference to a system of one or more computers that performs the process. The system can be, for example, the suggestion engine 170 described above with reference to FIG. 1.

At step 500, the system receives a user's query. The user's query may be a partial query or a complete query.

At step 510, the system selects one or more query suggestions for the user's query. The system may use conventional or other techniques to determine one or more of the query suggestions that are appropriate for the partial query. For example, the system may use prefix based matching. At step 520, the system then sends the selected query suggestions to the user.

Figure 6:
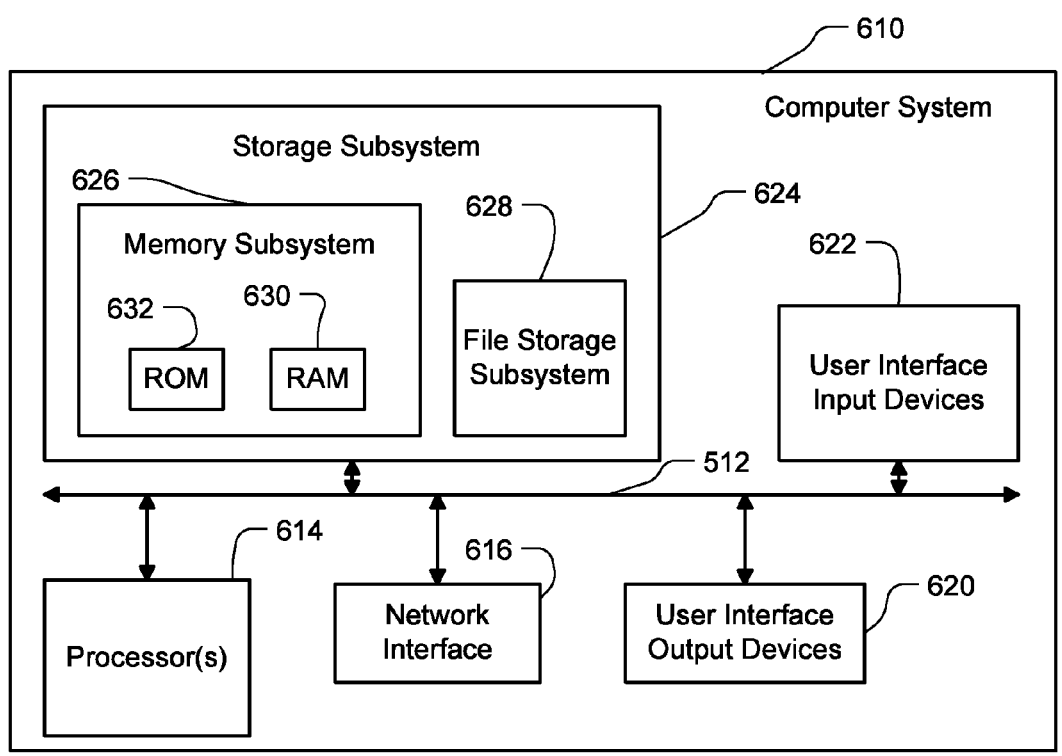
FIG. 6 is a block diagram of an example computer system.

FIG. 6 is a block diagram of an example computer system. Computer system 610 typically includes at least one processor 614 which communicates with a number of peripheral devices via bus subsystem 612. These peripheral devices may include a storage subsystem 624, comprising for example memory devices and a file storage subsystem, user interface input devices 622, user interface output devices 620, and a network interface subsystem 616. The input and output devices allow user interaction with computer system 610. Network interface subsystem 616 provides an interface to outside networks, including an interface to communication network 140, and is coupled via communication network 140 to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 610 or onto communication network 140.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein, including the logic to identify metadata within a document which is suitable for use as query suggestions according to the processes described herein. These software modules are generally executed by processor 614 alone or in combination with other processors.

Memory 626 used in the storage subsystem can include a number of memories including a main random access memory (RAM) 630 for storage of instructions and data during program execution and a read only memory (ROM) 632 in which fixed instructions are stored. A file storage subsystem 628 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 628 in the storage subsystem 624, or in other machines accessible by the processor.

Bus subsystem 612 provides a mechanism for letting the various components and subsystems of computer system 610 communicate with each other as intended. Although bus subsystem 612 is shown schematically as a single bus, alternative embodiments of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating the preferred embodiments. Many other configurations of computer system 610 are possible having more or fewer components than the computer system depicted in FIG. 6.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for identifying metadata within a document which is suitable for use as query suggestions, systems including logic and resources to identify metadata within a document which is suitable for use as query suggestions, systems that take advantage of computer-assisted methods for identifying metadata within a document which is suitable for use as query suggestions, media impressed with logic to identify metadata within a document which is suitable for use as query suggestions, data streams impressed with logic to identify metadata within a document which is suitable for use as query suggestions, or computer-accessible services that carry out computer-assisted methods for identifying metadata within a document which is suitable for use as query suggestions. It is contemplated that modifications and combinations will readily occur to those skilled in the art, which modifications and combinations will be within the scope of the following claims.

We claim as follows:

1. A computer implemented method comprising:
    obtaining metadata for a document, wherein the metadata includes a sequence of terms;
    assigning a tag to each term in the sequence of terms based at least in part on grammatical relationships between the terms, resulting in a corresponding sequence of tags;
    determining that the sequence of terms is grammatically correct based at least in part on tags within the corresponding sequence of tags;
    in response to the determination, storing the sequence of terms as a query suggestion within a database of query suggestions;
    in response to the determination, further calculating a suggestion score for the query suggestion based on one or more data points, and wherein storing the query suggestion includes storing the suggestion score with the query suggestion;
    receiving a partial search query;
    selecting one or more query suggestions in the database for the partial search query based at least in part on the suggestion scores; and
    sending the selected query suggestions in response to receiving the partial search query;
    wherein obtaining metadata for the document comprises segmenting the metadata for the document into a plurality of sequences of terms, wherein at least two of the plurality of sequences include at least some identical terms in different orders; and
    wherein assigning a tag comprises assigning a tag to each term in a given sequence of terms in the plurality of sequences of terms.

2. The computer implemented method of claim 1, wherein the database includes one or more additional query suggestions which have been submitted as past search queries by prior users, an additional query suggestion having a suggestion score based at least in part on a frequency that the additional query suggestion was submitted as a past search query by the prior users.

3. The computer implemented method of claim 1, wherein obtaining metadata for the document comprises obtaining a title of the document.

4. The computer implemented method of claim 1, further comprising obtaining a document score for the document, wherein the document score is based at least in part on a relative ranking of the document among a plurality of documents, and wherein the suggestion score is calculated based at least in part on the document score.

5. The computer implemented method of claim 1, wherein the assigned tags are part-of-speech tags.

6. The computer implemented method of claim 1, wherein determining that the sequence of terms is grammatically correct is based on a number of tags that is less than a total number of terms in the sequence of terms.

7. The computer implemented method of claim 1, wherein determining that the sequence of terms is grammatically correct is based at least in part on an order of the tags within the corresponding sequence of tags.

8. A non-transitory computer readable storage medium storing computer instructions executable by a processor to perform a method comprising:
    obtaining metadata for a document, wherein the metadata includes a sequence of terms;
    assigning a tag to each term in the sequence of terms based at least in part on grammatical relationships between the terms, resulting in a corresponding sequence of tags;
    determining that the sequence of terms is grammatically correct based at least in part on tags within the corresponding sequence of tags;
    in response to the determination, storing the sequence of terms as a query suggestion within a database of query suggestions;
    in response to the determination, further calculating a suggestion score for the query suggestion based on one or more data points, and wherein storing the query suggestion includes storing the suggestion score with the query suggestion;
    receiving a partial search query;
    selecting one or more query suggestions in the database for the partial search query based at least in part on the suggestion scores; and sending the selected query suggestions in response to receiving the partial search query;

wherein obtaining metadata for the document comprises segmenting the metadata for the document into a plurality of sequences of terms, wherein at least two of the plurality of sequences include at least some identical terms in different orders; and wherein assigning a tag comprises assigning a tag to each term in a given sequence of terms in the plurality of sequences of terms.

9. The non-transitory computer readable storage medium of claim 8, wherein the database includes one or more additional query suggestions which have been submitted as past search queries by prior users, an additional query suggestion having a suggestion score based at least in part on a frequency that the additional query suggestion was submitted as a past search query by the prior users.

10. The non-transitory computer readable storage medium of claim 8, wherein obtaining metadata for the document comprises obtaining a title of the document.

11. The non-transitory computer readable storage medium of claim 8, wherein the method further comprises obtaining a document score for the document, wherein the document score is based at least in part on a relative ranking of the document among a plurality of documents, and wherein the suggestion score is calculated based at least in part on the document score.

12. The non-transitory computer readable storage medium of claim 8, wherein the assigned tags are part-of-speech tags.

13. The non-transitory computer readable storage medium of claim 8, wherein determining that the sequence of terms is grammatically correct is based on a number tags that is less than a total number of terms in the sequence of terms.

14. The non-transitory computer readable storage medium of claim 8, wherein determining that the sequence of terms is grammatically correct is based at least in part on an order of the tags within the corresponding sequence of tags.

15. A system including memory and one or more processors operable to execute instructions, stored in the memory, comprising instructions to:

obtain metadata for a document, wherein the metadata includes a sequence of terms;

assign a tag to each term in the sequence of terms based at least in part on grammatical relationships between the terms, resulting in a corresponding sequence of tags;

determine that the sequence of terms is grammatically correct based at least in part on tags within the corresponding sequence of tags;

in response to the determination, store the sequence of terms as a query suggestion;

in response to the determination, further calculate a suggestion score for the query suggestion based on one or more data points, wherein the suggestion score is stored with the query suggestion;

receive a partial search query;

select one or more query suggestions in the database for the partial search query based at least in part on the suggestion scores; and send the selected query suggestions in response to receiving the partial search query;

wherein the instructions to obtain metadata for the document comprise instructions to segment the metadata within the document into a plurality of sequences of terms, wherein at least two of the plurality of sequences include at least some identical terms in different orders; and the instructions to assign a tag comprise instructions to assign a tag to each term in a given sequence of terms in the plurality of sequences of terms.

16. The system of claim 15, wherein the database includes one or more additional query suggestions which have been submitted as past search queries by prior users, an additional query suggestion having a suggestion score based at least in part on a frequency that the additional query suggestion was submitted as a past search query by the prior users.

17. The system of claim 15, wherein the instructions to obtain metadata for the document comprises instructions to obtain a title of the document.

18. The system of claim 15, wherein the instructions further comprise instructions to obtain a document score for the document, wherein the document score is based at least in part on a relative ranking of the document among a plurality of documents, and wherein the suggestion score is calculated based at least in part on the document score.

19. The system of claim 15, wherein the assigned tags are part-of-speech tags.

20. The system of claim 15, wherein the instructions to determine the sequence of terms is grammatically correct is based on a number of tags that is less than a total number of terms in the sequence of terms.

21. The system of claim 15, wherein the instructions to determine the sequence of terms is grammatically correct is based at least in part on an order of the tags within the corresponding sequence of tags.

\* \* \* \* \*